(12) United States Patent
Takahashi et al.

(10) Patent No.: US 6,868,210 B2
(45) Date of Patent: Mar. 15, 2005

(54) OPTICAL WAVEGUIDE AND THEIR APPLICATION OF THE OPTICAL COMMUNICATION SYSTEM

(75) Inventors: Makoto Takahashi, Kokubunji (JP); Tatemi Ido, Kodaira (JP); Hirohisa Sano, Niiza (JP); Tomoaki Shibata, Tsukuba (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 43 days.

(21) Appl. No.: 10/618,742

(22) Filed: Jul. 15, 2003

(65) Prior Publication Data

US 2004/0175075 A1 Sep. 9, 2004

(30) Foreign Application Priority Data

Mar. 7, 2003 (JP) ........................................ 2003-061176

(51) Int. Cl.[7] .............................. G02B 6/16; G02B 6/26; H01S 3/07
(52) U.S. Cl. ........................ 385/50; 385/123; 385/129; 359/333
(58) Field of Search ........................ 385/50–56, 88–90, 385/123, 129, 147, 142, 144, 125; 359/333, 346; 65/403, 435; 372/6

(56) References Cited

U.S. PATENT DOCUMENTS

| | | | | |
|---|---|---|---|---|
| 5,416,861 A | * | 5/1995 | Koh et al. .................... 385/14 |
| 6,236,784 B1 | | 5/2001 | Ido | |
| 6,288,833 B1 | * | 9/2001 | Kasamatsu .................. 359/333 |
| 6,356,692 B1 | | 3/2002 | Ido et al. | |
| 6,788,864 B2 | * | 9/2004 | Ahmad et al. ............... 385/123 |
| 6,801,698 B2 | * | 10/2004 | King et al. .................. 385/123 |
| 2003/0031443 A1 | * | 2/2003 | Soljacic et al. ............. 385/125 |
| 2003/0044159 A1 | * | 3/2003 | Anderson et al. ........... 385/142 |
| 2003/0049003 A1 | * | 3/2003 | Ahmad et al. ............... 385/123 |
| 2004/0197051 A1 | * | 10/2004 | Sercel et al. ................. 385/39 |

FOREIGN PATENT DOCUMENTS

| | | |
|---|---|---|
| JP | 2000-241640 | 9/2000 |
| JP | 2000-249874 | 9/2000 |
| JP | 2001-100055 | 4/2001 |
| JP | 2001-183539 | 7/2001 |
| JP | 2002-6155 | 1/2002 |

OTHER PUBLICATIONS

"European Conference on Optical Communication", 1998, p. 629.

"European Conference on Optical Communication", 1999, p. 312.

* cited by examiner

*Primary Examiner*—Akm Enayet Ullah
(74) *Attorney, Agent, or Firm*—Mattingly, Stanger, Malur & Brundige, P.C.

(57) ABSTRACT

An optical transmitter/receiver module of wavelength division multiplexing type which undergoes a reduced excess loss resulting from the displacement of a dicing position is fabricated with a high yield rate. An optical waveguide for guiding reflected light from a wavelength selection filter has a core substantially larger in size than the core of each of the other optical waveguides.

20 Claims, 14 Drawing Sheets

DISPLACEMENT OF
THE DICING POSITION [μm]

OPTICAL WAVEGUIDE AND THEIR APPLICATION OF THE OPTICAL COMMUNICATION SYSTEM

FIELD OF THE INVENTION

The present invention relates to an optical transmitter/receiver module for wavelength division multiplexing communication, to a PLC (Planar Lightwave Circuit), and to an optical system using the same.

BACKGROUND OF THE INVENTION

Wavelength division multiplexing communication using an optical fiber is an important technology for transmitting a large amount of information at a high speed. In recent years, a vigorous attempt has been made to provide a smaller-size and lower-cost optical transmitter/receiver module for use in wavelength division multiplexing communication by using a PLC to compose the module.

FIG. 18 is a conceptual view of a conventionally known optical module of PLC type, which is a cross-sectional view taken in a direction parallel to the surface of an optical waveguide substrate. Such an optical module is disclosed in "European Conference on Optical Communication p.629 (1998)" (Document 1). In the present module, a light signal with a wavelength $\lambda 1$ transmitted through a single-mode fiber 51 is incident on a single-mode optical waveguide 2a formed in a clad 1. The light with the wavelength $\lambda 1$ is transmitted by a wavelength selection filter 4 disposed in a dicing trench 3, passes through a single-mode wavelength 2b, and is received by a photodiode 52 mounted on a device mounting portion 5a formed in the same single substrate as the optical waveguides. From a semiconductor laser 53 mounted on a device mounting portion 5b formed in the same substrate as the optical waveguides, a light signal with a wavelength $\lambda 2$ is incident on a single-mode optical waveguide 2c. The light with the wavelength $\lambda 2$ is reflected by the wavelength selection filter 4, passes through the single-mode optical waveguide 2a, and is incident on the single-mode fiber 51 to be transmitted to the outside. Thus, the present module structure allows transmission/reception by wavelength division multiplexing using the light beams with the wavelengths $\lambda 1$ and $\lambda 2$. A photodiode 54 is for monitoring a light output from the semiconductor laser 53.

FIG. 19 shows a conceptual view of another conventionally known optical module of PLC type, which is a cross-sectional view taken in a direction parallel to the surface of an optical waveguide substrate. Such an optical module is disclosed in "European Conference on Optical Communication p.312 (1999)" (Document 2). In the present module, a light signal with a wavelength $\lambda 1$ transmitted through a single-mode fiber 51 is incident on a single-mode optical waveguide 2a formed in a clad 1. The light with the $\lambda 1$ is transmitted by a wavelength selection filter 4 fixed by adhesion to an end of the substrate and received by a photodiode 52. From a semiconductor laser 53, a light signal with a wavelength $\lambda 2$ is transmitted in the same manner as in the module shown in FIG. 16, which will be described later. Thus, the present structure also allows optical transmission/reception by wavelength division multiplexing.

FIG. 20 shows a conceptual view of still another conventionally known optical module of PLC type, which is a cross-sectional view taken in a direction perpendicular to the surface of an optical waveguide substrate. Such an optical module is disclosed in the Document 2 or in Japanese Patent Laid-Open No. 2000-249874. In the present module, a light signal with a wavelength $\lambda 1$ transmitted through a single-mode fiber 51 is incident on a single-mode optical waveguide 2d formed on a substrate 41. The single-mode optical waveguide 2d is formed between a lower clad 1a and an upper clad 1b. In the optical waveguide, a wavelength selection filter 4 is inserted obliquely to the surface of the substrate 41. In the present module, the wavelength selection filter 4 is imparted with a wavelength characteristic opposite to that of the wavelength selection filter 4 used in each of the foregoing two conventional embodiments. Specifically, the present module uses the wavelength selection filter 4 which reflects light with a wavelength $\lambda 1$ for reception and transmits a wavelength $\lambda 2$ for transmission. Accordingly, the light with the wavelength $\lambda 1$ incident on the single-mode optical waveguide 2d is reflected by the wavelength selection filter 4 and received by a photodiode 52 disposed on the surface of the optical waveguide. From a semiconductor laser 53, a light signal with the wavelength $\lambda 2$ is incident on the single-mode optical waveguide 2d. The light with the wavelength $\lambda 2$ is transmitted by the wavelength selection filter 4, passes through the single-mode optical waveguide 2d, and is incident on the single-mode fiber 51 to be transmitted to the outside. Thus, the present structure also allows transmission/reception by wavelength division multiplexing.

Japanese Patent Laid-Open No. 2002-6155 discloses an optical multiplexer/demultiplexer using an optical waveguide with an optical filter, which is constituted such that an optical multiplexing/demultiplexing portion is composed of a multi-mode interference optical waveguide for increased tolerance on the displacement of the optical filter and respective optical waveguides on the incidence side and on the reflection side have a specified distance therebetween at a coupling point with the multi-mode interference optical waveguide.

Thus, in any of the structures, the use of the foregoing conventional modules allows optical transmission/reception by wavelength division multiplexing. However, the following problems are likely to occur when the foregoing conventional embodiments are put into practical use.

In the conventional embodiment shown in FIG. 18, e.g., the photodiode 52 and the semiconductor laser 53 are mounted on the same single substrate so that electrical and optical insulation therebetween is weak and cross talk presents a problem. Specifically, an electric signal for modulating the semiconductor laser 53 readily affects the photodiode 52 via the substrate, while light leaked from a light beam from the semiconductor laser 53 upon incidence on the single-mode optical waveguide 2c passes under the wavelength selection filter 4 and also readily affects the photodiode 52 via the substrate. The present structure also has the problem that the displacement of the wavelength selection filter 4 causes an excess insertion loss in the path of reflected light. This is because axial displacement occurs between the light reflected from the filter and the optical waveguide on which the reflected light is incident. In other words, axial displacement occurs between the single-mode optical waveguide 2c and the single-mode optical waveguide 2a. Since the position of the wavelength selection filter 4 is determined by the dicing trench 3, the excess loss can be suppressed if positioning accuracy indicing is increased. In this case, however, the process steps are complicated to incur higher fabrication cost. As for the light transmitted by the filter, it does not undergo axial displacement in the path even when the filter is displaced so that dicing accuracy does not present a problem.

In the conventional embodiment shown in FIG. 19, the photodiode 52 is disposed on a substrate different from that of the semiconductor laser 53. In addition, the wavelength selection filter 4 covers the entire end of the substrate so that the problem of cross talk is negligible both electrically and optically. However, the structure shown in FIG. 19 is similar to the structure shown in FIG. 18 in that an excess insertion loss is likely to occur in the path of the reflected light due to the displacement of the filter.

In the conventional embodiment shown in FIG. 20, the wavelength selection filter 4 should be inserted obliquely to the surface of the optical waveguide. Consequently, dicing for inserting the wavelength selection filter 4 should also be performed obliquely. However, the step of performing oblique dicing with respect to the surface is more complicated than the step of perpendicular dicing so that mounting cost is likely to be increased. In the present structure, due to the arrangement of element components, stray light from the semiconductor laser 53 that has leaked out of the single-mode optical waveguide 2d readily enters the photodiode 52 so that optical cross talk presents a problem. To prevent the cross talk, it is necessary to dispose a filter for cutting light with the wavelength $\lambda 2$ for transmission between the wavelength selection filter 4 and the photodiode 52. However, a complicated mounting process is required to place the wavelength selection filter, the filter for cutting the light for transmission, and the photodiode in succession on the surface of the optical waveguide so that a higher cost for the module is incurred. To prevent this, the foregoing example disclosed in the Document 2 uses a device in which a semiconductor layer for absorbing the light with the wavelength $\lambda 2$ for transmission is provided in the photodiode 52, thereby achieving simpler mounting. However, such a device is special and less available so that it presents an obstacle when the optical transmitter/receiver module is mass produced at low cost as a general-purpose product. Since the absorption wavelength of a semiconductor is dependent on temperature, if the present device is used, the reception characteristic thereof is easily degraded by a temperature change.

In the foregoing conventional embodiment disclosed in Japanese Patent Laid-Open No. 2002-6155, the multi-mode optical waveguide in which the filter is inserted is long so that the structure of the entire module is increased in size. It may also be considered that the reflected light from the filter readily returns to the inside of the single-mode.

Thus, it has been difficult to fabricate an optical module with excellent characteristics at low cost even with the foregoing prior art technologies. The present invention has been achieved to solve the foregoing problems.

SUMMARY OF THE INVENTION

It is therefore an object of the present invention to provide an optical module structure with high fabrication tolerance and with excellent characteristics and an optical system using the same.

Another object of the present invention is to provide an optical module structure that can be scaled down without impairing the characteristic of dicing tolerance and an optical system using the same.

To increase the displacement tolerance on the filter in the module according to the present invention, an optical waveguide for guiding reflected light from the filter has a core which is substantially not less than twice and not more than twenty times as large as the core of an optical waveguide in another path.

According to one aspect of the present invention, an optical waveguide includes a substrate, a clad formed of a transparent material, and a core formed of a transparent material having a refractive index higher than a refractive index of the clad, the clad and the core being provided on the substrate, the optical waveguide comprising at least: a first optical waveguide; a filter, a mirror structure, or a substrate end structure for reflecting light from the first optical waveguide; and a second optical waveguide provided to receive reflected light from the first optical waveguide, a typical value or an average value of a diameter, a width, or a thickness of the core of the second optical waveguide being adjusted to be substantially not less than twice and not more than twenty times as large as a typical value or an average value of a diameter, a width, or a thickness of the core of the first optical waveguide.

By thus forming the optical waveguide for guiding reflected light with a core which is substantially not less than twice as large as the core of the other optical waveguide, the reflected light from the filter is more likely to be incident upon the core so that, even if the wavelength selection filter is displaced and axial displacement occurs in the path, the occurrence of an excess loss is suppressed. For example, the displacement tolerance on the filter in a direction horizontal to the substrate surface can be increased if the width of the core is increased and the displacement tolerance on the filter in a direction perpendicular to the substrate surface can be increased if the thickness of the core is increased. It will easily be appreciated that an optical waveguide with a core having both an increased width and an increased thickness may also be used appropriately.

If the typical value or average value of the diameter, width, or thickness of the core of the second optical waveguide is more than the diameter of a light receiving device or the light receiving surface of a multi-mode fiber, each for receiving light having passed through the second optical waveguide and being reflected from the first optical waveguide, leakage occurs To prevent the leakage, the typical value or average value of the diameter, width, or thickness of the core of the second optical waveguide may be adjusted appropriately to be not more than the diameter of the light receiving device or the light receiving surface of the multi-mode fiber, each for receiving the reflected light. From such a viewpoint, the typical value or average value of the diameter, width, or thickness of the core of the second optical waveguide may be adjusted appropriately for a practical application to be substantially not more than twenty times the typical value or average value of the diameter, width, or thickness of the core of the first optical waveguide.

Another aspect of the present invention is an optical system capable of single-mode fiber communication or multi-mode fiber communication, the optical system comprising the foregoing optical waveguide.

If the module of the present invention is applied to the optical system for single-mode fiber communication, a structure in which the wavelength selection filter reflects light for reception and transmits light for transmission is adopted and the optical waveguide other than the optical waveguide for guiding reflected light from the filter is formed as a single-mode optical waveguide. The optical waveguide for guiding reflected light from the filter may be formed appropriately to have a core larger than the core of the other optical waveguide. In the present structure, the light for transmission passes only through the single-mode optical waveguide so that light incident on the single-mode fiber retains a single-mode property and satisfies requirements placed on single-mode fiber communication.

If the module of the present invention is applied to an optical system for multi-mode fiber communication, transmission light may also be multi-mode light. Accordingly, the wavelength characteristic of the wavelength selection filter may be in either of the modes. Each of the waveguides may be formed as a multi-mode optical waveguide.

DETAILED DESCRIPTION OF THE PREFERRED EMBODIMENTS

Figure 1:
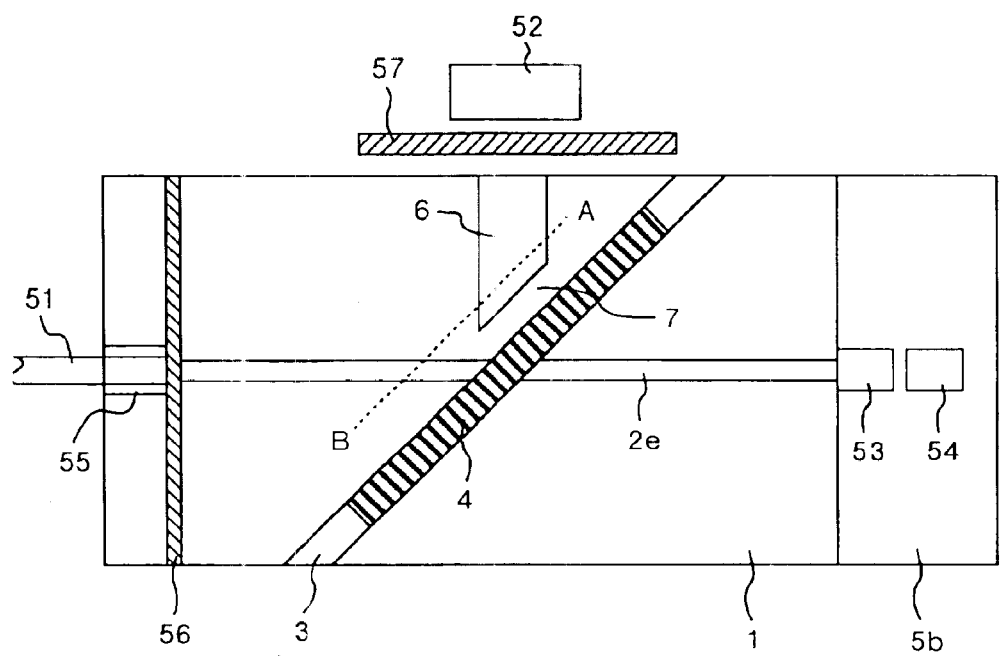
FIG. 1 is a generally plan view showing an optical transmitter/receiver module of wavelength division multiplexing type according to a first embodiment of the present invention.

FIG. 1 is a generally plan view showing an optical transmitter/receiver module of wavelength division multiplexing type having an optical waveguide according to a first embodiment of the present invention. The module according to the present embodiment has a linear single-mode optical waveguide (first optical waveguide) 2e provided in a substrate (clad) 1 and a multi-mode optical waveguide (second optical waveguide) 6 branched from the first optical waveguide 2e in the vicinity of a dicing trench 3. A gap 7 is provided between the first and second optical waveguides 2e and 6 to prevent the occurrence of air bubbles during fabrication. The wavelength selection filter 4 is disposed in the dicing trench 3.

In the optical transmitter/receiver module of wavelength division multiplexing type according to the present embodiment, a light signal with a wavelength λ2 from a semiconductor laser 53 mounted on the device mounting portion 5b formed in the same single substrate as the optical waveguides is incident on the first optical waveguide 2e. The light with the wavelength λ2 is transmitted by a wavelength selection filter 4, subsequently guided by the first optical waveguide 2e, and incident on a single-mode fiber 51 to be transmitted to the outside.

A photodiode 54 is for monitoring an optical output from the semiconductor laser 53. The single-mode fiber 51 is positioned in fixed relation by a V-trench 55 and a dicing trench 56. In the present module, a light signal with a wavelength λ1 from the single-mode fiber 51 is also incident on the first optical waveguide 2e. The light is reflected by the wavelength selection filter 4, passes through the second optical waveguide 6, and reaches the end of the optical waveguide substrate to be radiated to the outside. The light radiated from the optical waveguide substrate is received by a photodiode 52 disposed on another substrate. The photodiode may also be another light receiving device. Likewise, it will easily be understood that the photodiode may also be replaced with another light-receiving device in the following description.

In the optical transmitter/receiver module of wavelength division multiplexing type according to the present embodiment, the second optical waveguide 6 for guiding reflected light from the filter has a core which is substantially not less than twice as large as the core of the first optical waveguide 2e. If the core of each of the first and second optical waveguides 2e and 6 has a rectangular cross-sectional configuration and the same thickness, e.g., the typical value or average value of the width of the core of the second optical waveguide 6 is not less than twice as large as the typical value or average value of the width of the core of the first optical waveguide 2e. Likewise, if the core of each of the first and second optical waveguides 2e and 6 has a rectangular cross-sectional configuration and the same width, the typical value or average value of the thickness of the core of the second optical waveguide 6 is not less than twice as large as the typical value or average value of the width or thickness of the core of the first optical waveguide 2e. If the core of each of the first and second optical waveguides 2e and 6 has a circular or ellipsoidal configuration, the typical value or average value of the diameter of the core of the second optical waveguide 6 is not less than twice as large as the typical value or average value of the diameter of the core of the first optical waveguide 2e.

If the typical value or average value of the diameter, width, or thickness of the core of the second optical waveguide 6 is not more than the diameter of a light receiving device or the light receiving surface of a multi-mode fiber, each for receiving light having passed through the second optical waveguide 6 and being reflected from the first optical waveguide 2e, leakage occurs. To prevent the leakage, the typical value or average value of the diameter, width, or thickness of the core of the second optical waveguide 6 may be adjusted appropriately to be not more than the diameter of the light receiving device for receiving the reflected light or the diameter of the light receiving surface of the multi-mode fiber. From such a viewpoint, the typical value or average value of the diameter, width, or thickness of the core of the second optical waveguide 6 may be adjusted appropriately for a practical application to be substantially not more than twenty times as large as the typical value or average value of the diameter, width, or thickness of the core of the first optical waveguide 2e.

For the purpose of cutting light with an unnecessary wavelength within the path or the like, the core of each of the first and second optical waveguides 2e and 6 is modulated with another configuration such as a tapered configuration or a stepped configuration. For example, if the re is a possibility that a light input signal with a wavelength of 1.3 $\mu$m includes a noise signal with a wavelength of 1.5 $\mu$m, the configurations of the optical waveguides may also be partly modulated for the removal of the noise signal.

If the core of the second optical waveguide 6 is increased in size in the present structure, the displacement tolerance on the wavelength selection filter 4 can be increased. Since the photodiode 52 is mounted on a substrate different from that of the semiconductor laser 53, the problem of electrical cross talk does not occur.

Figure 19:
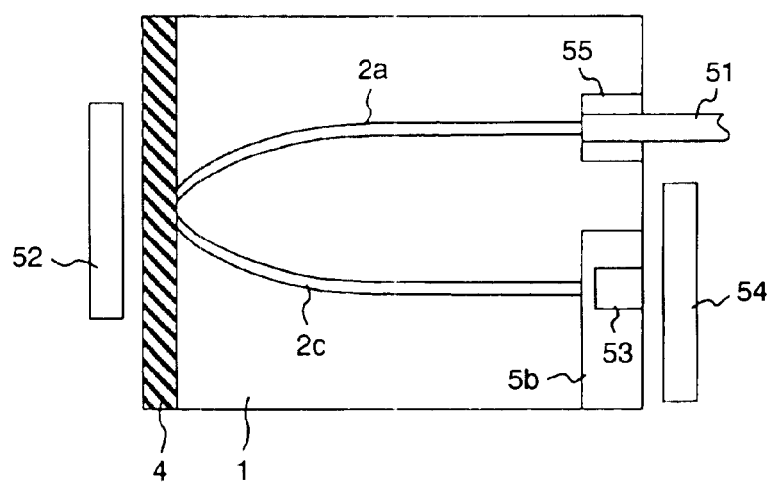
FIG. 19 is a view showing another conventional module.

In addition, the present embodiment has also made provision against optical cross talk by using a cut filter 57 for cutting light for transmission, which is disposed between the optical waveguide substrate and the photodiode 52. Since the cut filter 57 is provided only for the cutting of the light, it is sufficient for the cut filter 57 to be merely disposed between the optical waveguide substrate and the photodiode 52. Such positioning accuracy as required of the wavelength selection filter 4 according to the conventional embodiment shown in FIG. 19 is not required of the cut filter 57.

Figure 20:
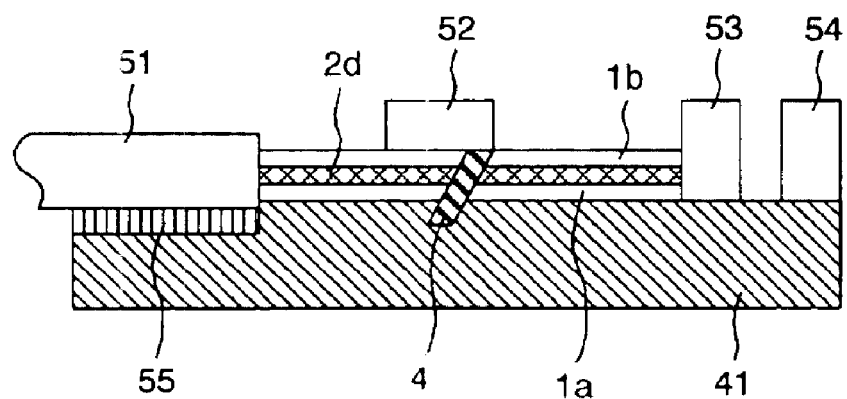
FIG. 20 is a view showing still another conventional module.

Moreover, it is sufficient for the cut filter 57 to be mounted on a substrate different from the optical waveguide substrate, similarly to a normal optical device, so that a complicated mounting process as has been performed for mounting at the surface of the optical waveguide, which has been mentioned in the conventional embodiment shown in FIG. 20, is unnecessary.

Figure 2:
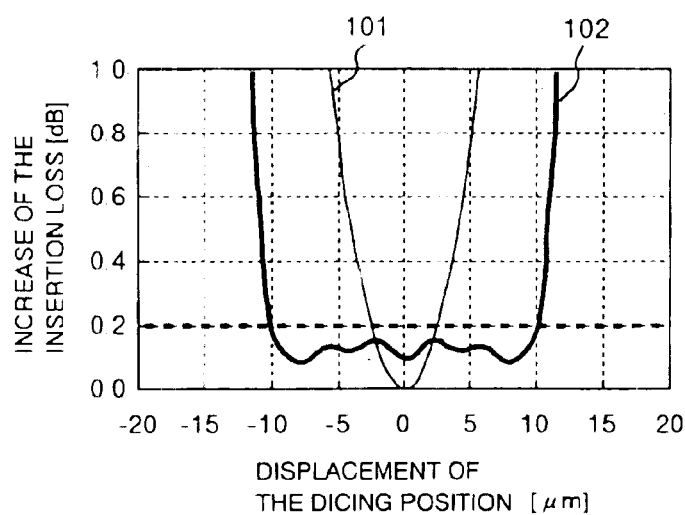
FIG. 2 is a view showing the effect of the first embodiment.

The curve 102 in FIG. 2 shows the result of calculating, by a 2D BPM, a relationship between the displacement of the dicing trench 3 and a loss in the path of the reflected light from the wavelength selection filter 4 in the present device. It was assumed here that, if the origin was at the position of intersection of the respective center axes of the first and second optical waveguides 2e and 6, the dicing position was displaced in a direction perpendicular to the filter surface and the dicing position had a positive value on the side provided with the second optical waveguide 6 beyond the origin. It was also assumed that the refractive index difference $\Delta$ between the core and the clad was 0.4%, the width of the first optical waveguide 2e was 6.5 $\mu$m, the width of the second optical waveguide 6 was 30 $\mu$m, and the gap 7 between the dicing trench 4 and the second optical waveguide 6 was 8 $\mu$m.

The size of the core of the second optical waveguide 6 in this example is quadruple the size of the core of the first optical waveguide 2e.

The loss of the reflected light in this structure leads to the loss of the intensity of light received by the photodiode 52. The photodiode 52 is reached not only by the light in the second optical waveguide 6 but also by ambient light under free propagation. Therefore, the loss was determined from the intensity of entire light present within a range of 25 $\mu$m on each of the left and right sides of the center of the second optical waveguide 6 after the reflected light propagated the second optical waveguide 6 by 100 $\mu$m.

Figure 18:
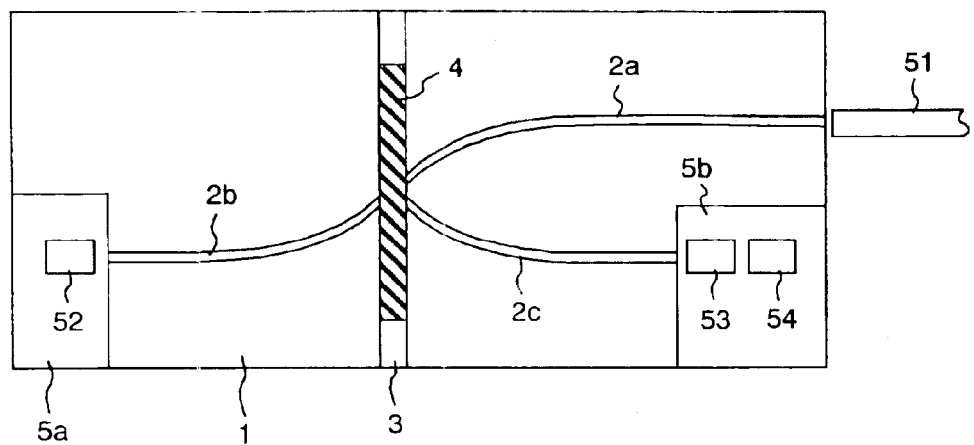
FIG. 18 is a view showing a conventional module.

The reason for the loss observed in the curve 102 even in the absence of the displacement of the dicing position is that the gap 7 is provided. The curve 101 in the drawing shows a relationship between the displacement of the dicing position and a loss in the conventional embodiment shown in FIG. 18. In the structure shown in FIG. 18, a loss in the path of the reflected light indicates a coupling efficiency with the single-mode fiber. The coupling efficiency with the single-mode fiber was calculated by assuming that the refractive index difference $\Delta$ between the core and the clad was 0.4% and the width of each of the first optical waveguides 2c and 2a was 6.5 $\mu$m. In the present calculation, it was also assumed that the wavelength of the light was 1.31 $\mu$m and no gap was provided between the dicing trench and each of the optical waveguides.

From FIG. 2, it can be seen that the displacement tolerance on the dicing position against an increase of 0.2 dB in loss has been increased to about 10 $\mu$m in the case of the embodiment of the present invention shown in FIG. 1 in contrast to the case of the conventional embodiment shown in FIG. 19 where the displacement tolerance is about $\pm 2$ $\mu$m. Since typical dicing accuracy during mass production is about $\pm 5$ $\mu$m, it will be understood that mass production with a high yield rate is sufficiently possible if the structure in which the size of the core of the second optical waveguide is not less than twice and not more than twenty times as large as the size of the core of the first optical waveguide is adopted.

Figure 3A:
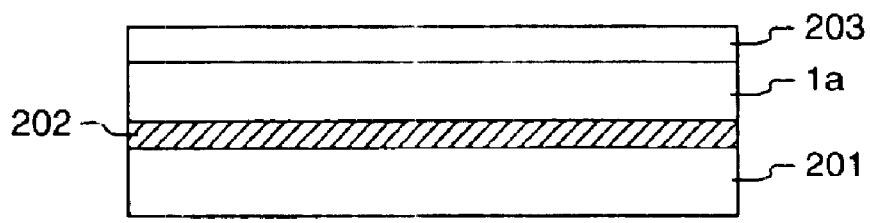
FIGS. 3A, 3B, and 3C are cross-sectional views illustrating a fabrication method according to the first embodiment, which have been taken along the line A-B of FIG. 1.
Figure 3B:
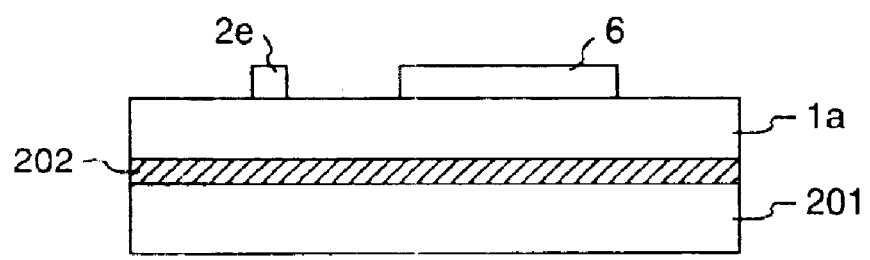
Figure 3C:
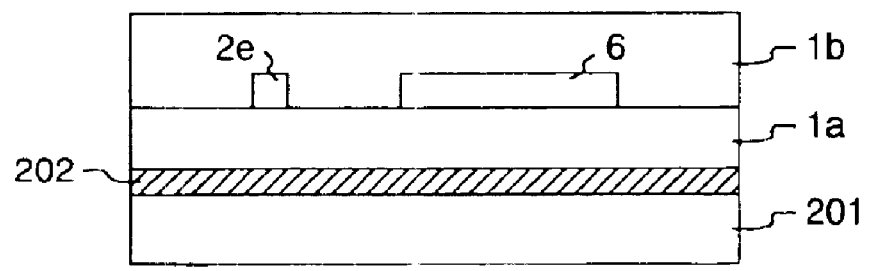

FIGS. 3A, 3B, and 3C show a method for fabricating the module shown in FIG. 1. A description will be given herein by using, as an example, the case where the optical waveguides are formed of a polymer material. FIG. 3A to 3C are cross-sectional views each taken along the line A–B of FIG. 1. First, a lower polymer clad layer 1a and a polymer core layer 203 are formed by spin coating on a Si substrate 201 with a SiO$_2$ film 202. Then, the first and second optical waveguides 2e and 6 are formed by etching in accordance with a well-known method such that the size of the core of the optical waveguide 6 is substantially not less than twice and not more than twenty times as large as the size of the core of the optical waveguide 2e. Thereafter, an upper polymer clad layer 1b is formed by spin coating, the trench is formed by dicing, the filter is inserted, and the n the optical device is mounted, whereby the present module is fabricated.

Figure 4:
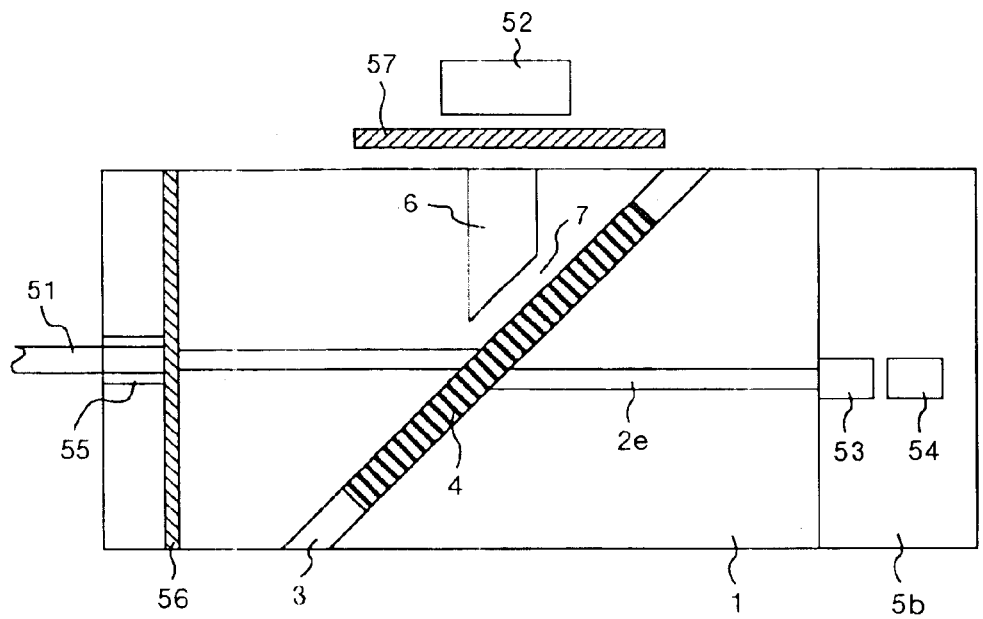
FIG. 4 is a view showing a module according to a second embodiment of the present invention.

FIG. 4 shows a second embodiment of the present invention. In an optical transmitter/receiver module of wavelength division multiplexing type according to the present embodiment also, the size of the core of the optical waveguide 6 for guiding reflected light from the filter is substantially not less than twice and not more than twenty times as large as the size of the core of the first optical waveguide 2e. The present embodiment may also impart a level difference to the path of the first optical waveguide 2e anterior and posterior to the filter in correspondence with the refraction of light resulting from the refractive index difference between the optical waveguide layer and the filter. With the present structure, a loss in the direction of transmission due to the refraction of light by the filter can be reduced.

Figure 5:
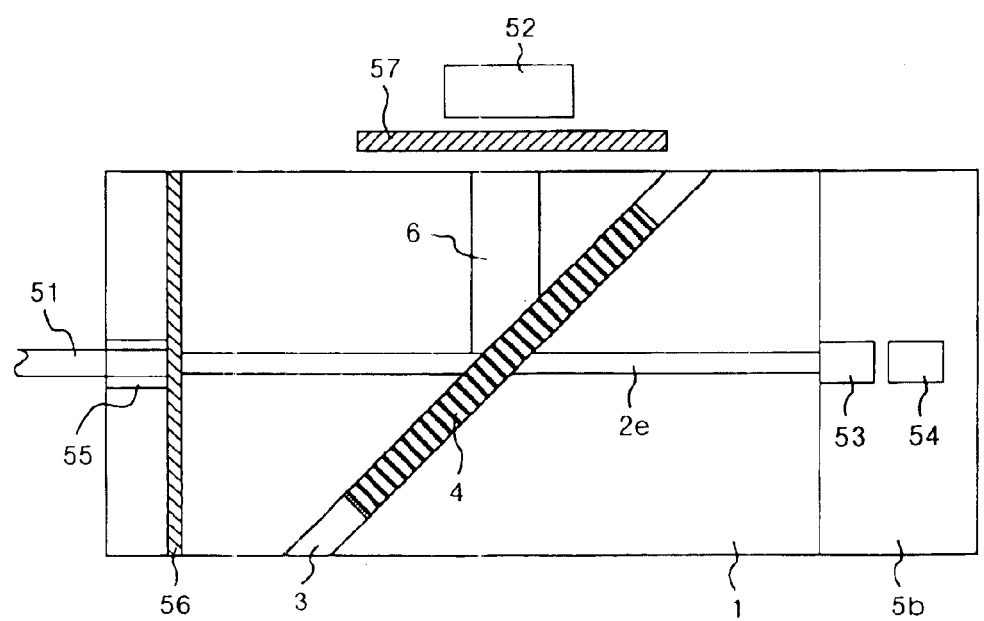
FIG. 5 is a view showing a module according to a third embodiment of the present invention.

FIG. 5 shows a third embodiment of the present invention. In the present module, the size of the core of the optical waveguide 6 for guiding reflected light from the filter is substantially not less than twice and not more than twenty times as large as the size of the core of the first optical waveguide 2e. In the case where the generation of air bubbles can be suppressed during the fabrication of the optical waveguides or where the influence of generated air bubbles is negligible, a gap need not be provided between the first and second optical waveguides 2e and 6 in the same manner as in the present embodiment.

Figure 6:
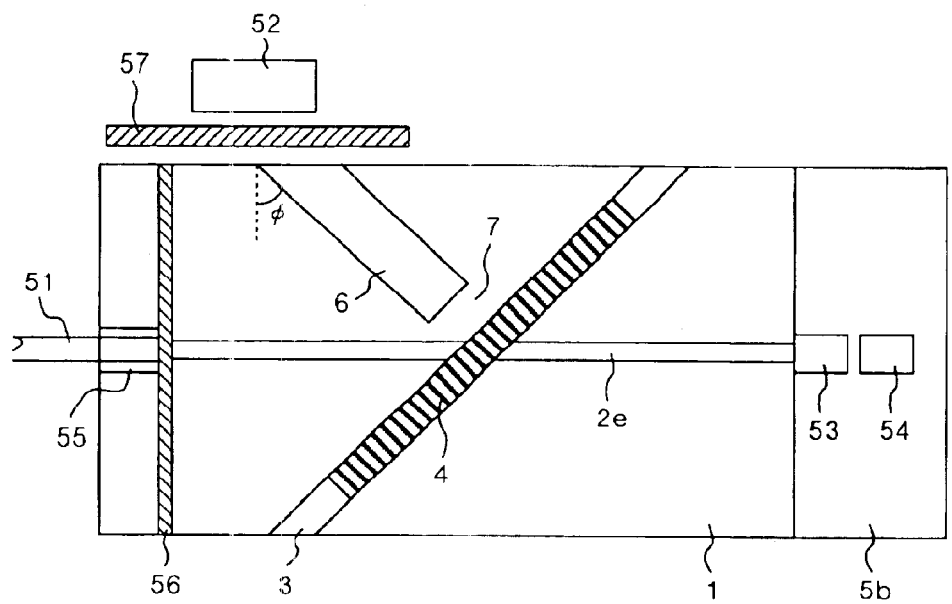
FIG. 6 is a view showing a module according to a fourth embodiment of the present invention.

FIG. 6 shows a fourth embodiment of the present invention. In the present module also, the size of the core of the optical waveguide 6 for guiding reflected light from the filter is substantially not less than twice and not more than twenty times as large as the size of the core of the first optical waveguide 2e. In the present embodiment, the angle φ formed between the optical axis of the second optical waveguide 6 and a normal to the substrate end need not be fixed to a zero degree. If the angle φ is adjusted to, e.g., about 8 to 10 degrees, the reflected light from the photodiode 52 to the second optical waveguide 6 can be reduced without reducing the intensity of the light received by the photodiode 52.

Figure 7:
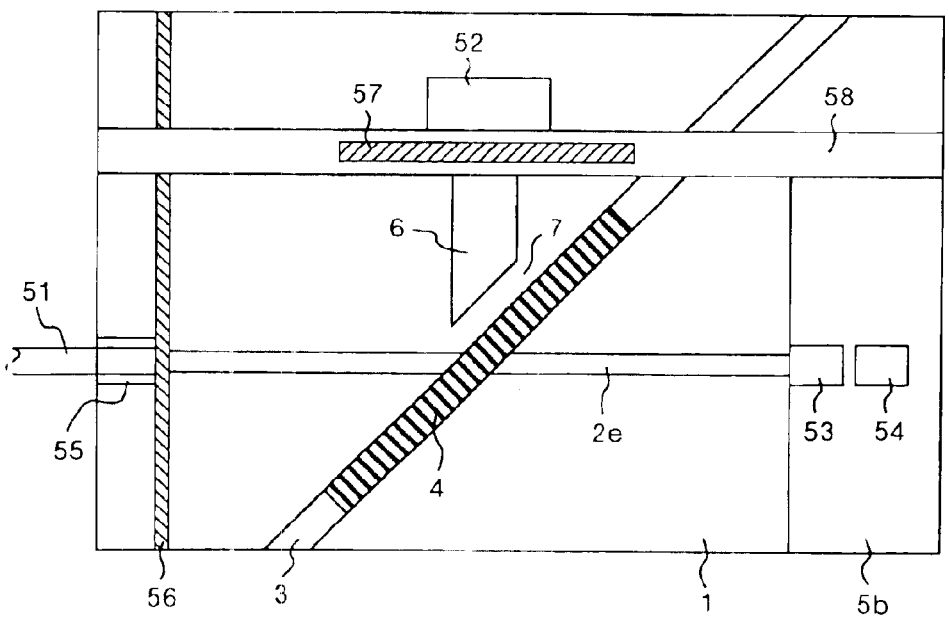
FIG. 7 is a view showing a module according to a fifth embodiment of the present invention.

FIG. 7 shows a fifth embodiment of the present embodiment. In the present module also, the size of the core of the second optical waveguide 6 for guiding reflected light from the filter is substantially not less than twice and not more than twenty times as large as the size of the core of the first optical waveguide 2e. In the present embodiment, the photodiode 52 may also be formed on the same single substrate as the semiconductor laser 53 in the case where cross talk between the photodiode 52 and the semiconductor laser 53 can be suppressed or where the occurrence of cross talk presents no problem. In this case, the cut filter 57 may also be disposed by using, e.g., a dicing trench 58.

Figure 8:
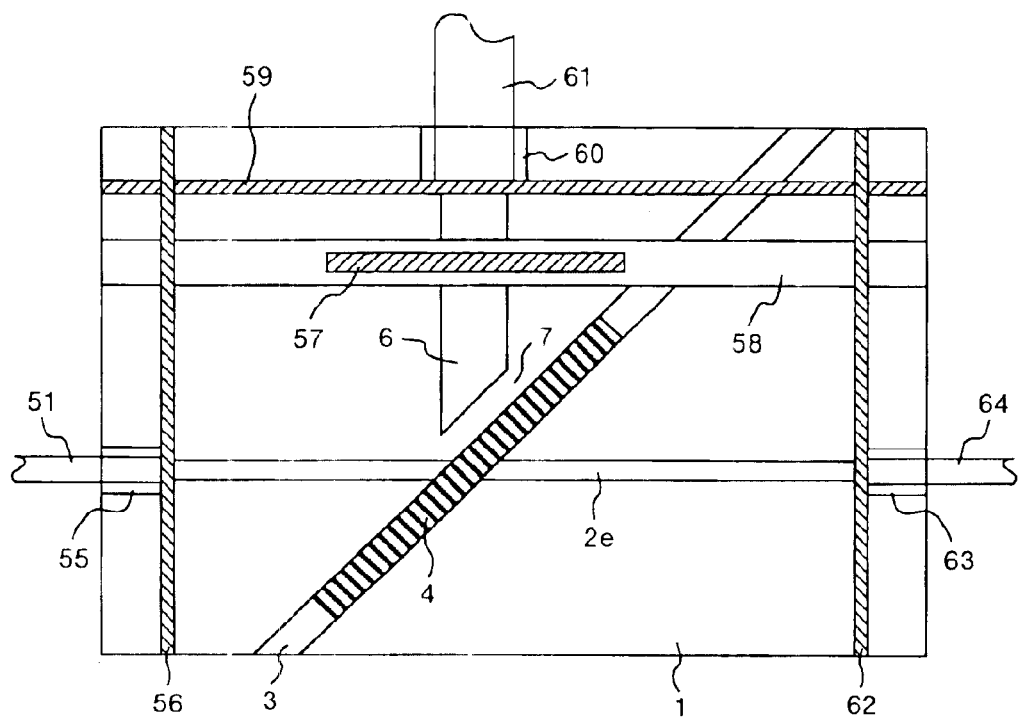
FIG. 8 is a view showing a module according to a sixth embodiment of the present invention.

FIG. 8 shows a sixth embodiment of the present invention. In the module of the present embodiment also, the size of the core of the second optical waveguide 6 for guiding reflected light from the filter is substantially not less than twice and not more than twenty times as large as the size of the core of the first optical waveguide 2e. In the present embodiment, an optical fiber is used in place of the optical devices used in the other embodiments. In an optical module having the structure shown in FIG. 7, it is also possible to use, e.g., a single-mode fiber 64 positioned in fixed relation by a V-trench 63 and a dicing trench 62 instead of the semiconductor laser 53 and use, e.g., a multi-mode fiber 61 positioned in fixed relation by a V-trench 60 and a dicing trench 59 instead of the photodiode 52.

Figure 9:
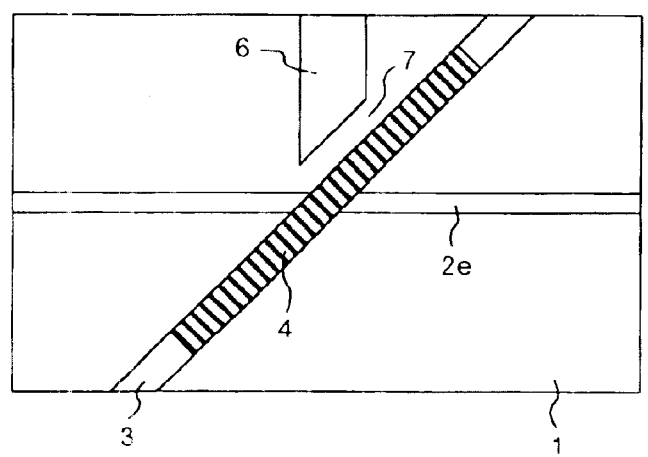
FIG. 9 is a view showing a module according to a seventh embodiment of the present invention.

FIG. 9 shows a seventh embodiment of the present invention. In the module of the present embodiment also, the size of the core of the second optical waveguide 6 for guiding reflected light from the filter is substantially not less than twice and not more than twenty times as large as the size of the core of the first optical waveguide 2e. In the module of the present embodiment, an optical device and an optical fiber are formed discretely and separately from the optical waveguide substrate.

Figure 10:
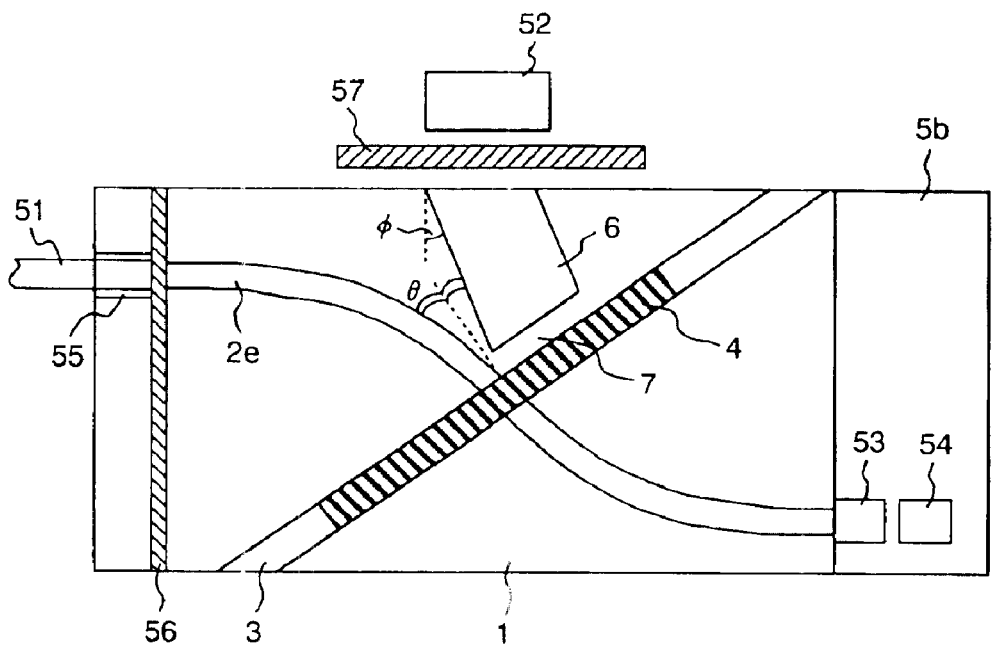
FIG. 10 is a view showing a module according to an eighth embodiment of the present invention.

FIG. 10 shows an eighth embodiment of the present invention. In the present embodiment, the first optical waveguide 2e may also be formed into a curved configuration. This allows the angles θ formed between the respective optical axes of the first and second optical waveguides 2e and 6 and a normal to the wavelength selection filter 4 to be set individually and arbitrarily. Since the wavelength characteristic of the wavelength selection filter is generally dependent on the angle θ, optimal filter characteristics are obtainable if the angle θ is adjusted to 25 degrees or less, preferably to the range of 8 to 10 degrees with respect to each of the optical axes of the first and second optical waveguides 2e and 6. If the angle 8 is reduced, the distance between the first and second optical waveguides 2e and 6 relative to the displacement of the filter in a direction perpendicular to the filter surface is reduced. As a result, the displacement tolerance on the dicing position against a loss is also increased.

Figure 11:
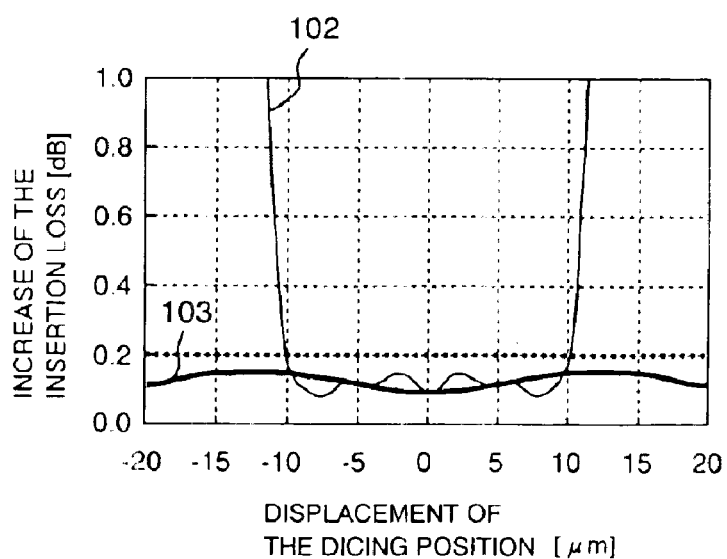
FIG. 11 is a view showing the effect of the eighth embodiment.

The curve 103 in FIG. 11 shows the result of calculating a relationship between the displacement of the dicing position in a direction perpendicular to the filter surface and a loss when the angle θ is adjusted to 8 degrees in the structure of FIG. 10. Parameters and a calculation method used herein are the same as those shown in FIG. 2. In the drawing, the result of calculation obtained in the structure shown in FIG. 1 in which the angle θ is adjusted to 45 degrees is shown as the curve 102. From the drawing, it can be seen that the dicing tolerance is further increased by reducing the angle θ.

Figure 12:
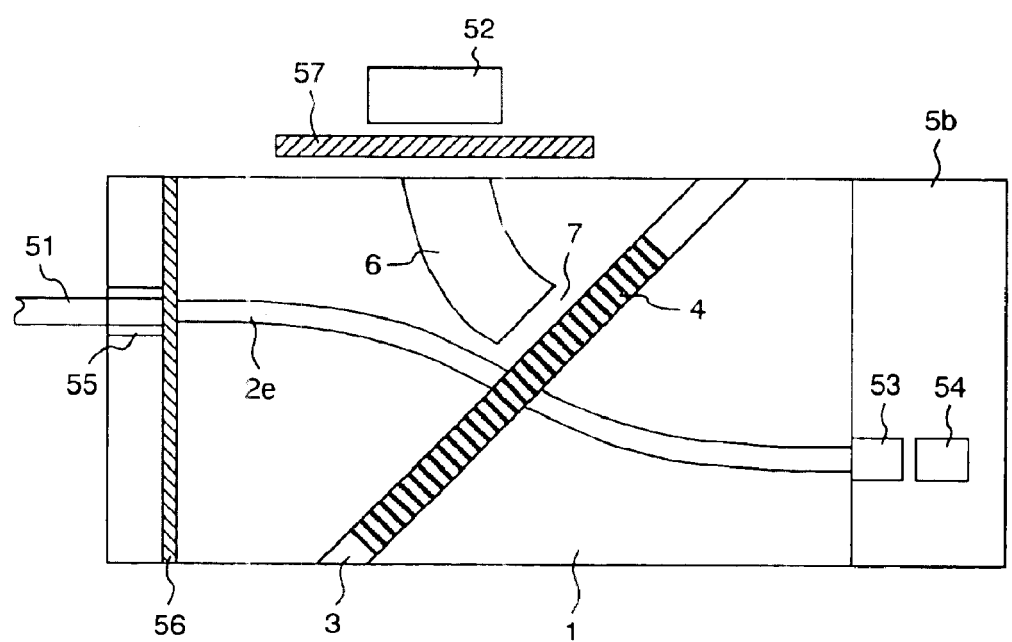
FIG. 12 is a view showing a module according to a ninth embodiment of the present invention.

FIG. 12 shows a ninth embodiment of the present invention. In the present embodiment, not only the first optical waveguide 2e but also the second optical waveguide 6 may be formed into a curved configuration. In general, an optical waveguide has a lower-limit radius of curvature which allows it to be curved without causing a loss. By curving the second optical waveguide 6 also, therefore, desired angles θ and φ can be achieved with a smaller module size than in the case where only the first optical waveguide 2e is curved.

It is to be noted that a smaller module can be formed as the radius of curvature is smaller. The lower-limit radius of curvature which allows a waveguide to be curved without causing a loss is higher as the refractive index difference Δ between the core and clad of the optical waveguide 2e is higher. For example, the lower-limit radius of curvature can be reduced to about 15 to 5 mm by increasing the refractive index difference Δ from 0.4%, which is a value obtained with a conventional typical quartz optical waveguide, to 0.8%. In the present invention, therefore, the foregoing refractive index difference Δ is preferably increased to a higher value. If the refractive index difference Δ is increased to, e.g., 0.6% to 1.5%, the module can be scaled down without impairing the characteristic of dicing tolerance or the like.

Figure 13:
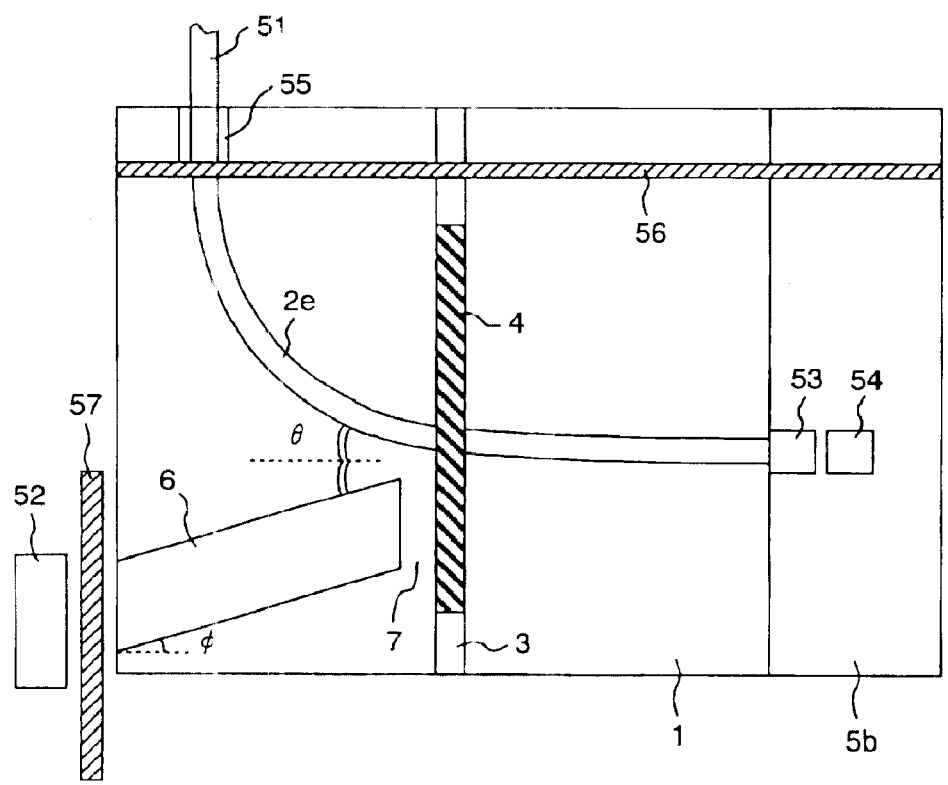
FIG. 13 is a view showing a module according to a tenth embodiment of the present invention.

FIG. 13 shows a tenth embodiment of the present invention. The present embodiment may have a structure in which the filter surface is horizontal to the substrate end. The present structure implements a simpler and easier dicing step since dicing with respect to the substrate end and dicing with respect to the filter 4 are performed horizontally.

Figure 14:
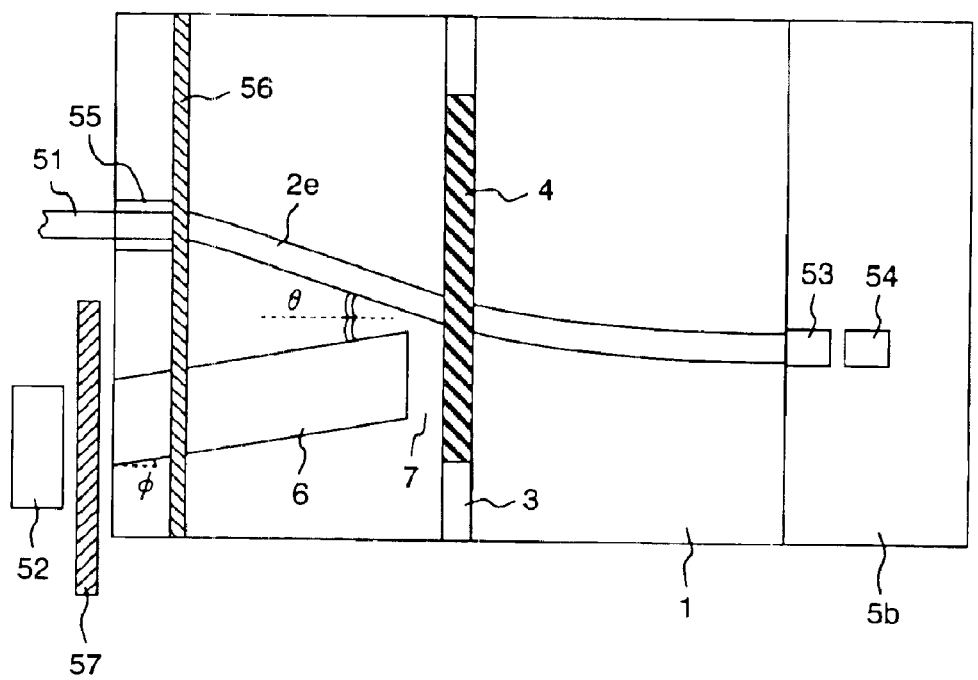
FIG. 14 is a view showing a module according to an eleventh embodiment of the present invention.

FIG. 14 shows an eleventh embodiment of the present invention. In the present embodiment, the photodiode 52 and the single-mode fiber are disposed on the same single end of the substrate.

Figure 15:
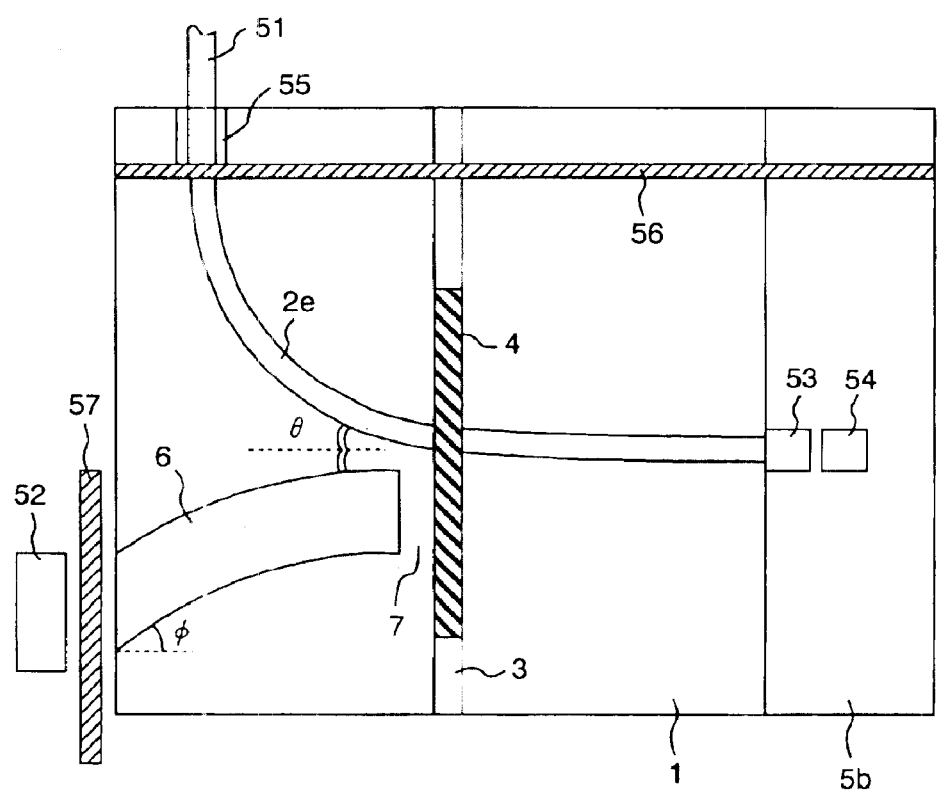
FIG. 15 is a view showing a module according to a twelfth embodiment of the present invention.

FIG. 15 shows a twelfth embodiment of the present invention. In the present embodiment, the second optical waveguide 6 in the structure shown in FIG. 13 is also formed into a curved configuration.

Figure 16:
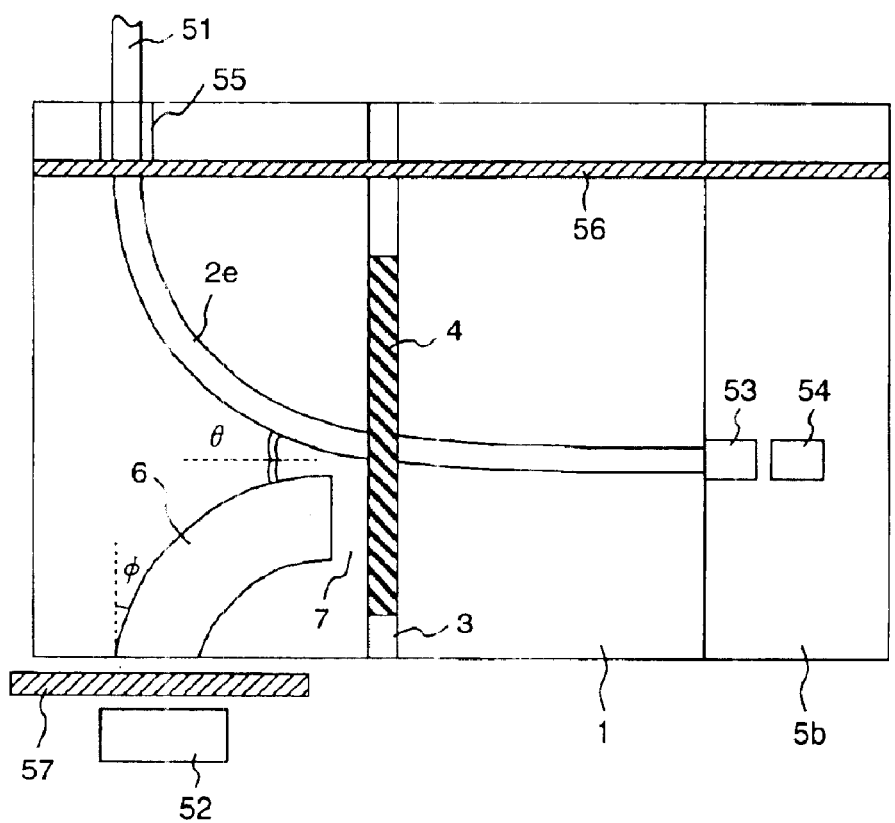
FIG. 16 is a view showing a module according to a thirteenth embodiment of the present invention.

FIG. 16 shows a thirteenth embodiment of the present invention. In the present embodiment, the photodiode 52 and the single-mode fiber are disposed at the ends of the substrate opposed to each other.

Figure 17:
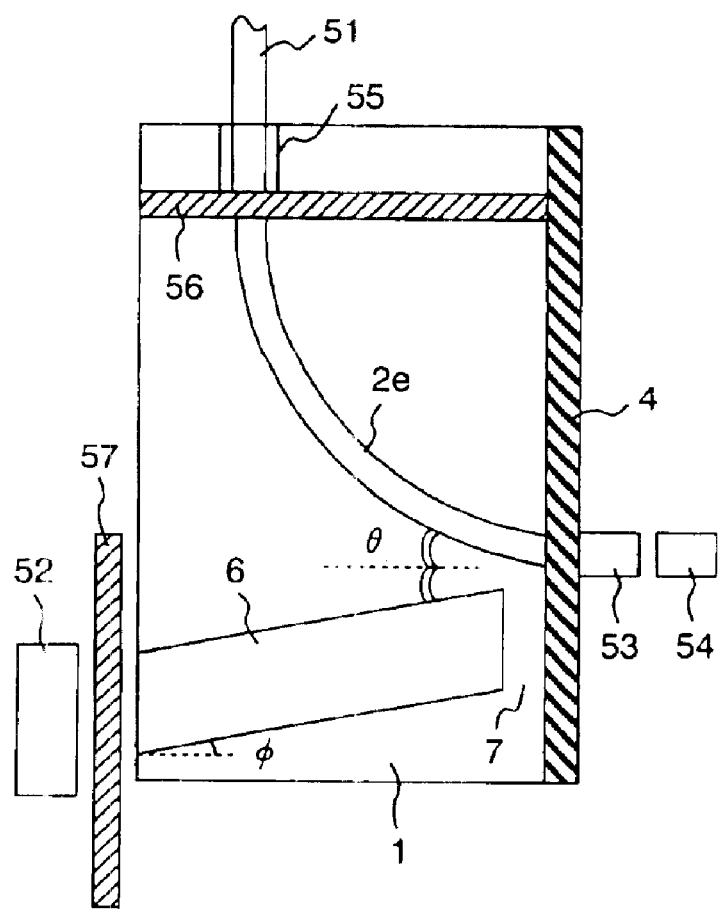
FIG. 17 is a view showing a module according to a fourteenth embodiment of the present invention.

FIG. 17 shows a fourteenth embodiment of the present invention. The present embodiment uses a structure in which the wavelength selection filter 4 is in contact relation with the substrate end.

In each of the embodiments of the present invention, the first optical waveguide is formed as a single-mode optical waveguide throughout the entire path. The second optical waveguide may be formed as a multi-mode optical waveguide throughout the entire path or, alternatively, may have a part thereof formed as a multi-mode optical waveguide and the other part thereof formed as a single-mode optical waveguide.

According to the individual embodiments of the present invention described above, the re can be obtained optical transmitter/receiver modules of wavelength division multiplexing type having excellent characteristics.

In the case where the se modules are applied to optical systems for single-mode fiber communication, the structure in which the wavelength selection filter reflects light for reception and transmits light for transmission is used and the optical waveguides other than the optical waveguide for guiding reflected light from the filter are formed as single-mode optical waveguides. The optical waveguide for guiding reflected light from the filter may be formed appropriately to have a core larger than the cores of the other waveguides. In this case, the optical waveguide for guiding reflected light from the filter is normally formed as a multi-mode optical waveguide. In a special case where the optical waveguides other than the optical waveguide for guiding reflected light have sufficiently small cores compared with higher-order-mode cut-off conditions, however, the effects of the present invention are achievable even if the optical waveguide for guiding reflected light is formed as a single-mode wavelength. In the present structure, transmission light passes only through the single-mode optical waveguide so that light incident on the single-mode fiber retains a single-mode property and satisfies requirements placed on single-mode fiber communication. Although light incident on the photodiode 52 becomes multi-mode light, no problem is encountered since reception characteristics are dependent only on the total intensity of light incident on the photodiode 52 and are not dependent on the mode configuration.

In the case where the module of the present invention is applied to an optical system for multi-mode fiber communication, transmission light may also be multi-mode light so that the wavelength characteristic of the wavelength selection filter may be of either type. It is also possible to form each of the optical waveguides as a multi-mode optical waveguide.

The present invention is effective irrespective of the materials of the substrate, the optical waveguides, and the other components and is not limited to the cases described in the foregoing embodiments. For example, a polymer material may also be used instead of a conventional quartz-based material. The configuration of the substrate is not also limited to a rectangle described in the foregoing embodiments. The positional relations among the optical waveguides, the ends, the optical element, the optical fiber, and the filter are not limited to those described in the foregoing embodiments, either. The configurations of the optical waveguides are not also limited to those described in the foregoing embodiments. It is also possible to transform the optical waveguides into other configurations in the vicinity of the filter and the optical device or at other portions.

The present invention allows high-yield mass production of an optical transmitter/reception module of wavelength division multiplexing type having excellent characteristics and provides an optical transmitter/reception module of wavelength division multiplexing type that can be scaled down without degrading dicing tolerance.

What is claimed is:

1. An optical waveguide including, on a substrate, a clad formed of a transparent material, and a core formed of a transparent material having a refractive index higher than a refractive index of the clad, said optical waveguide comprising at least:
   a first optical waveguide;
   a filter, a mirror structure, or a substrate end structure for reflecting light from said first optical waveguide; and
   a second optical waveguide provided to receive reflected light from said first optical waveguide,
   a typical value or an average value of a diameter, a width, or a thickness of the core of said second optical waveguide being adjusted to be substantially not less than twice and not more than twenty times as large as a typical value or an average value of a diameter, a width, or a thickness of the core of said first optical waveguide.

2. The optical waveguide of claim 1, wherein the reflected light from said first optical waveguide that has passed through said second optical waveguide is received by a light receiving device or a multi-mode fiber.

3. The optical waveguide of claim 2, wherein a filter for removing light having a wavelength other than a wavelength of the reflected light from said first optical waveguide is disposed between said second optical waveguide and said light receiving device or said multi-mode fiber.

4. The optical waveguide of claim 2, wherein each of angles θ formed between respective optical axes of said first and second optical waveguides and a normal to said filter is adjusted to 25 degrees or less.

5. The optical waveguide of claim 2, wherein an angle φ formed between an optical axis of said second optical waveguide and a normal to an end of said substrate is adjusted to 5 degrees or more.

6. The optical waveguide of claim 4, wherein a filter for removing light having a wavelength other than a wavelength of the reflected light from said first optical waveguide is disposed between said second optical waveguide and the light receiving device or the multi-mode fiber.

7. The optical waveguide of claim 5, wherein a filter for removing light having a wavelength other than a wavelength of the reflected light from said first optical waveguide is disposed between said second optical waveguide and the light receiving device or the multi-mode fiber.

8. The optical waveguide of claim 4, wherein an angle φ formed between the optical axis of said second optical waveguide and a normal to an end of said substrate is adjusted to 5 degrees or more.

9. The optical waveguide of claim 8, wherein the reflected light from said first optical waveguide that has passed through said second optical waveguide is received by the light receiving device or the multi-mode fiber.

10. The optical waveguide of claim 8, wherein said first optical waveguide is formed into a curved configuration.

11. The optical waveguide of claim 9, wherein said first optical waveguide is formed into a curved configuration.

12. The optical waveguide of claim 10, wherein a radius of curvature of said first optical waveguide is adjusted to 8 mm or less.

13. The optical waveguide of claim 11, wherein a radius of curvature of said first optical waveguide is adjusted to 8 mm or less.

14. The optical waveguide of claim 12, wherein a refractive index difference between the core and clad Δ of said first optical waveguide is adjusted to 0.6% or more.

15. The optical waveguide of claim 13, wherein a refractive index difference between the core and clad Δ of said first optical waveguide is adjusted to 0.6% or more.

16. The optical waveguide of claim 15, wherein said second optical waveguide is formed into a curved configuration.

17. The optical waveguide of claim 6, wherein said first optical waveguide is formed as a single-mode optical waveguide throughout an entire path thereof and said second optical waveguide is partly formed as a multi-mode optical waveguide.

18. The optical waveguide of claim 17, wherein the diameter, width, or thickness of the core of said first or second optical waveguide is modulated with a tapered configuration, a stepped configuration, or other configurations in a path at a distance from an end opposing a position at which said filter or mirror structure is placed or the end structure.

19. An optical system capable of single-mode fiber communication, said optical system comprising the optical waveguide as recited in claim 6.

20. An optical system capable of multi-mode fiber communication, said optical system comprising the optical waveguide as recited in claim 6.

* * * * *